(No Model.)
P. WOLF.
SHAFT AND POLE COUPLING.
No. 552,165. Patented Dec. 31, 1895.
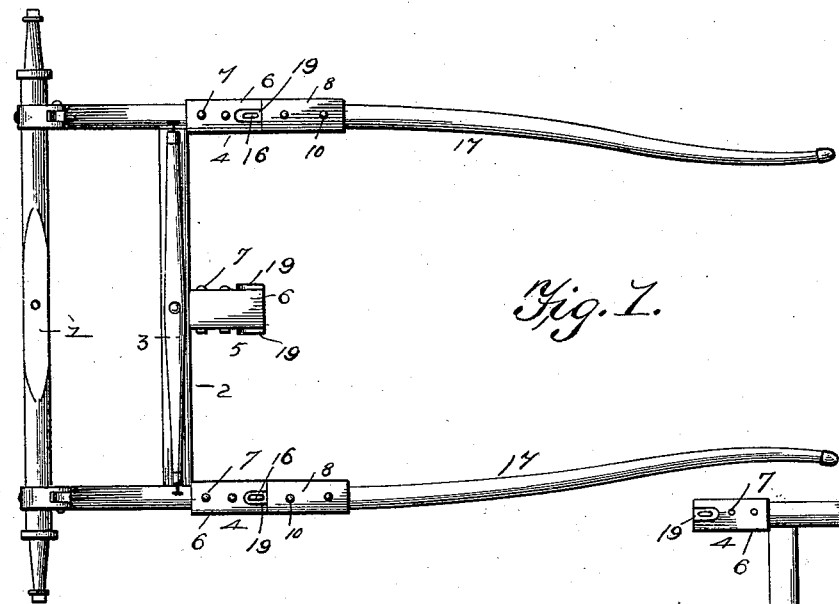
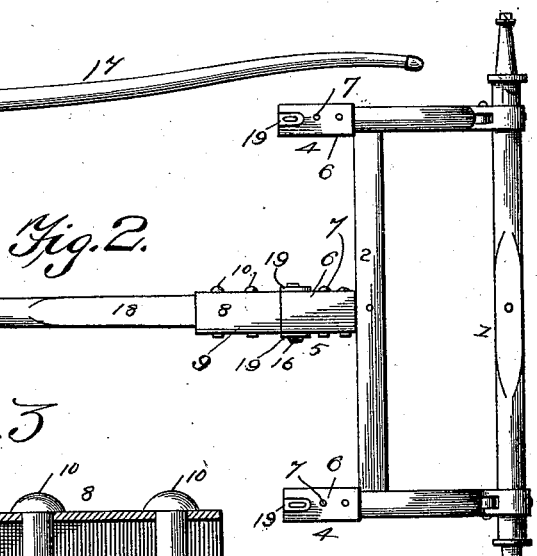
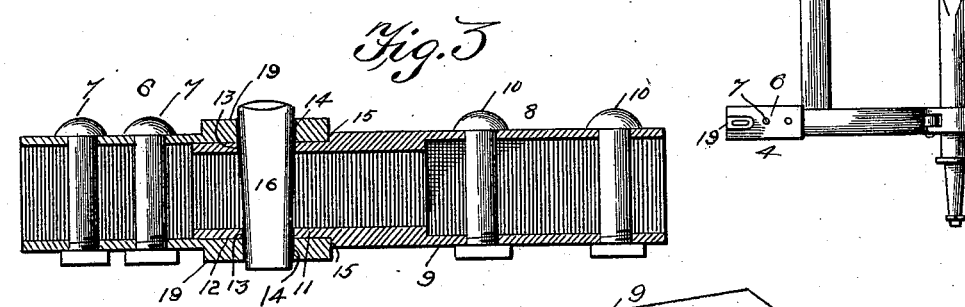
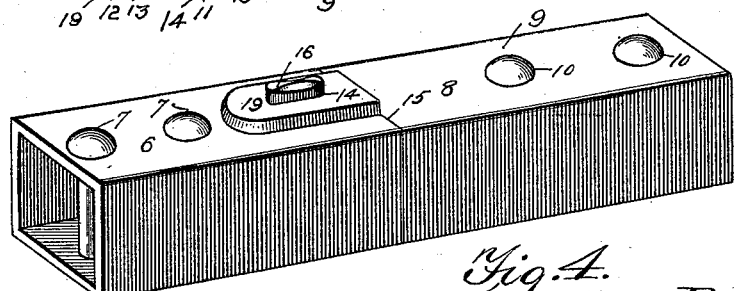
Inventor
Peter Wolf.
Witnesses
By his Attorneys.

UNITED STATES PATENT OFFICE.

PETER WOLF, OF CHEYENNE, WYOMING, ASSIGNOR OF ONE-HALF TO LEOPOLD KABIS, OF SAME PLACE.

SHAFT AND POLE COUPLING.

SPECIFICATION forming part of Letters Patent No. 552,165, dated December 31, 1895.

Application filed April 11, 1895. Serial No. 545,338. (No model.)

*To all whom it may concern:*

Be it known that I, PETER WOLF, a citizen of the United States, residing at Cheyenne, in the county of Laramie and State of Wyoming, have invented a new and useful Shaft and Pole Coupling, of which the following is a specification.

My invention relates to a coupling device for connecting poles and shafts to vehicles, the object in view being to provide a simple and efficient construction of coupling for attachment to a vehicle whereby either a pole or shafts may be arranged in operative position without difficulty or loss of time.

Further objects and advantages of this invention will appear in the following description, and the novel features thereof will be particularly pointed out in the appended claim.

In the drawings, Figure 1 is a plan view of a front portion of the running-gear of a vehicle provided with couplings constructed in accordance with my invention, shafts being shown applied thereto. Fig. 2 is a similar view showing a pole in operative position. Fig. 3 is a vertical central section of the coupling. Fig. 4 is a detail in perspective of the same.

Similar numerals of reference indicate corresponding parts in all the figures of the drawings.

A' designates the front portion of the running-gear of a vehicle having stub thills or arms connected by a cross-bar 2 for supporting a whiffletree 3, and projecting forward beyond said cross-bar are the side arms or projections 4 and the central arm or projection 5. These arms or projections each carry one member 6 of a coupling embodying my invention, said member consisting of a shell which is fitted upon the arm or projection and is secured thereto by means of bolts 7. The other member 8 of the coupling, one of which is carried by each shaft and the pole, (shown respectively in Figs. 1 and 2,) comprises a shell 9 fitted upon and secured to the end of the shaft or tongue by means of bolts 10, and a reduced rear end or stud 11, which is fitted in a socket 12 formed by the front end of the fixed member, which is carried by the running-gear. The reduced portion or projection at the rear end of the front or movable member of the coupling is provided in its upper and lower sides with vertically-aligned slots 13 adapted to register with corresponding slots 14 formed in the upper and lower sides of the socket, said slots in the projection and socket being adapted to register when the shoulder 15 at the front end of the projection or reduced portion of the front member is in contact with the front or free end of the rear or stationary member. A key 16 is employed to engage said registering slots and thereby secure the members of the coupling temporarily together. The slots in the upper sides of the projection and socket are longer than those in the lower sides of said parts, and the key is tapered toward its lower end, thus providing for the tightening of the key by the jarring of the vehicle rather than the loosening or displacement thereof.

The rear portion of the bore of the detachable member of the coupling is reduced to form shoulders 20 for engagement by the extremity of the shaft or pole arranged in the socket portion of said member, and the extremity of the reduced portion or projection 11 of said member is adapted to bear against the extremity of the portion of the running-gear which is fitted and secured in the member 6, whereby rearward pressure upon the shaft or pole is communicated directly to the running-gear. Furthermore, the shoulder 15 at the front end of the reduced portion or projection 11 of the detachable member bears against the extremity of the socket into which said reduced portion or projection is fitted.

It will be seen that one of the rear members of the coupling is placed upon each of the side and central arms or projections on the vehicle running-gear, and that the shafts 17 (shown in Fig. 1) and the pole 18 (shown in Fig. 2) are provided each with one of the front members, whereby either the shafts or the pole may be used, according to whether one or more horses are to be used, the removal of one and the adjustment of the other being accomplished by the manipulation of the fastening-key, which may be displaced by striking the lower end thereof.

It will be seen that each member of the coupling is of integral construction, and may be of drawn-steel, the portions of the socket contiguous to the slots in the upper and lower sides thereof being reinforced by the bosses 19.

Furthermore, the improved coupling consists of a light shell and is of minimum weight while possessing the requisite strength, and the exterior surfaces of the members are flush when united, and hence it does not differ materially in appearance from an ordinary band embracing the joint between a shaft or pole and the connected portion of the running-gear.

Various changes in the form, proportion, and the minor details of construction may be resorted to without departing from the spirit or sacrificing any of the advantages of this invention.

Having described my invention, what I claim is—

The combination with a running gear having stub-thills or arms connected by a cross-bar carrying a whiffletree, of thill and pole couplings each comprising a hollow stationary member or socket, a detachable member having a reduced extension to fit in the socket and a key for securing said members in operative position, one of the stationary members or sockets being arranged opposite each stub-thill or arm and at the center of said cross-bar connecting the stub-thills or arms, and one of the detachable members having a reduced extension being secured to each thill and the pole, substantially as specified.

In testimony that I claim the foregoing as my own I have hereto affixed my signature in the presence of two witnesses.

PETER WOLF.

Witnesses:
P. JACOB GAUFF,
ALB. BENDER.